United States Patent [19]
Uematsu

[11] Patent Number: 5,157,536
[45] Date of Patent: Oct. 20, 1992

[54] OPTICAL APPARATUS HAVING SPRING HOLDING MEANS FOR LENSES

[75] Inventor: Masashi Uematsu, Tokyo, Japan

[73] Assignee: Kabushiki Kaisha Toshiba, Kawasaki, Japan

[21] Appl. No.: 631,141

[22] Filed: Dec. 20, 1990

[30] Foreign Application Priority Data

Dec. 25, 1989 [JP] Japan .................. 1-332617

[51] Int. Cl.⁵ .................................. G02B 26/10
[52] U.S. Cl. .............................. 359/217; 359/196; 346/108; 358/296
[58] Field of Search .......... 359/217, 216, 212, 819, 359/827, 820; 250/234, 235, 236; 346/108; 358/296

[56] References Cited

U.S. PATENT DOCUMENTS 4,868,673  9/1989  Negoro ........................ 346/108
4,977,412 12/1990  Komori et al. ................ 346/108

Primary Examiner—Loha Ben
Attorney, Agent, or Firm—Foley & Lardner

[57] ABSTRACT

An optical apparatus according to this invention has an optical member for scanning light beams, a datum surface to which the optical member is fixed, an elastic member for fixing the optical member to the datum surface by pressing the optical member against the datum surface so that the optical member is placed easily and accurately on the datum surface by means of the elastic member. The optical member is fixed to the datum surface only by means of the elastic member, enabling the optical member to be replaced easily.

5 Claims, 6 Drawing Sheets

OPTICAL APPARATUS HAVING SPRING HOLDING MEANS FOR LENSES

BACKGROUND OF THE INVENTION

1. Field of the Invention

This invention relates to an optical apparatus, and more particularly to an optical apparatus used in an image forming apparatus, such as a laser printer.

2. Description of the Related Art

In general, an optical apparatus in equipment as a laser printer, which employs an electronic photo-process as an image displaying means, comprises a light source for producing light beams modulated according to recording signals, a collimator lens system for forming the light beams from the light source into a predetermined shape, a light polarizing unit for reflecting the light beams onto an object to be scanned or an information-recorded medium such as a photosensitive member, a first imaging optical system (such as an imaging lens assembly) and a second imaging optical system (such as an fθ lens or the like).

The light beams generated in the light source are led through the collimator lens system to a light reflector, that is, the light polarizing unit, and are reflected thereby at a uniform angular motion. The light beams from the light polarizing unit form an image on the object to be scanned such as a photosensitive member by means of the first and second imaging optical systems which are arranged between a rotary polygonal mirror consisting of an fθ lens or the like and the object to be scanned.

The lenses used in the first and second imaging optical systems are fixed to the optical apparatus by means of adhesive or plate springs.

The use of the adhesive for the lens fixture needs a relatively long time for drying the adhesive, requiring an idle time and a location where the optical apparatus is placed while it is being dried. Further, when the lenses are fixed in a displaced state, or scratched or flawed, the whole unit of the optical apparatus must be replaced.

On the other hand, the use of the plate springs for the lens fixture makes the shape of the plate springs complicated, thereby increasing the cost of the springs. Further, the employment of the springs requires the correction of the lens displacement and the regulation of the pressure of the springs, and makes the assembly of the lenses complicated.

SUMMARY OF THE INVENTION

The object of this invention is to provide an optical apparatus which makes it simple to carry out, at a low cost, the fixture of lenses or the like as an optical system in the optical apparatus, and allows for the easy replacement of lenses.

An optical apparatus according to this invention comprises optical means for scanning light beams, a datum surface to which the optical means is fixed, an elastic member for fixing the optical means to the datum surface under pressure.

The optical apparatus can include housing means for containing the optical means and having the datum surface formed thereon.

The optical means can have a curved face for receiving a pressure applied by the elastic member in any one of the above structures. Further, the curved face of the optical means can assume a groove shape.

The structure of the optical apparatus according to this invention ensures easy arrangement of the optical elements on the datum surface by the use of the elastic member. Further, the fixing of the optical elements only by means of the elastic member enables the optical members to be simply replaced. Still further, the number of parts can be decreased and the accumulative dimensional errors are reduced accordingly, because the optical elements are mounted in the housing means. In addition, the optical apparatus can be small, since the elastic member for effecting the fixture of the optical elements is placed in the level range in which the optical members are disposed.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
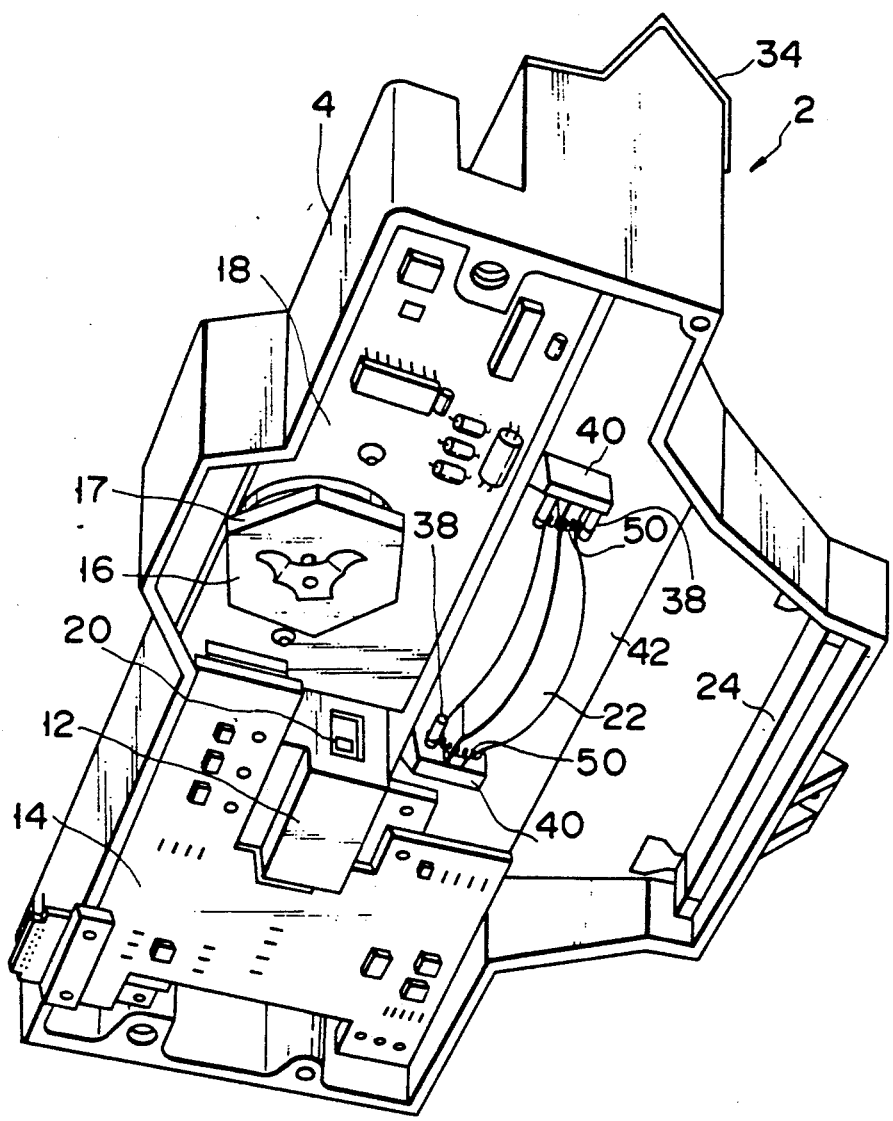
FIG. 1 is a perspective view of an optical apparatus according to this invention, with a bottom plate removed.
Figure 2:
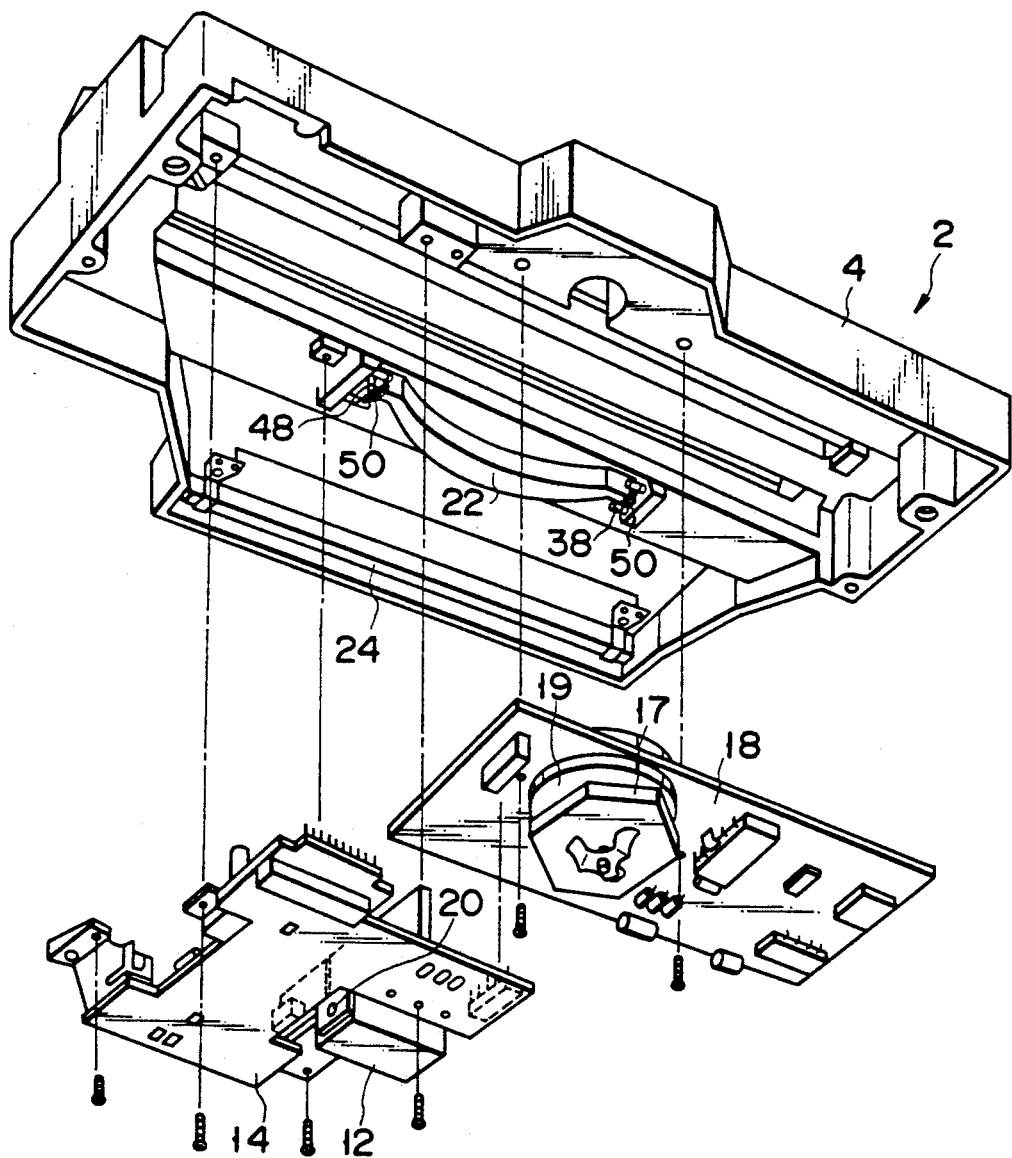
FIG. 2 is an exploded perspective view of the optical apparatus shown in FIG. 1, with the electric elements removed therefrom.
Figure 3:
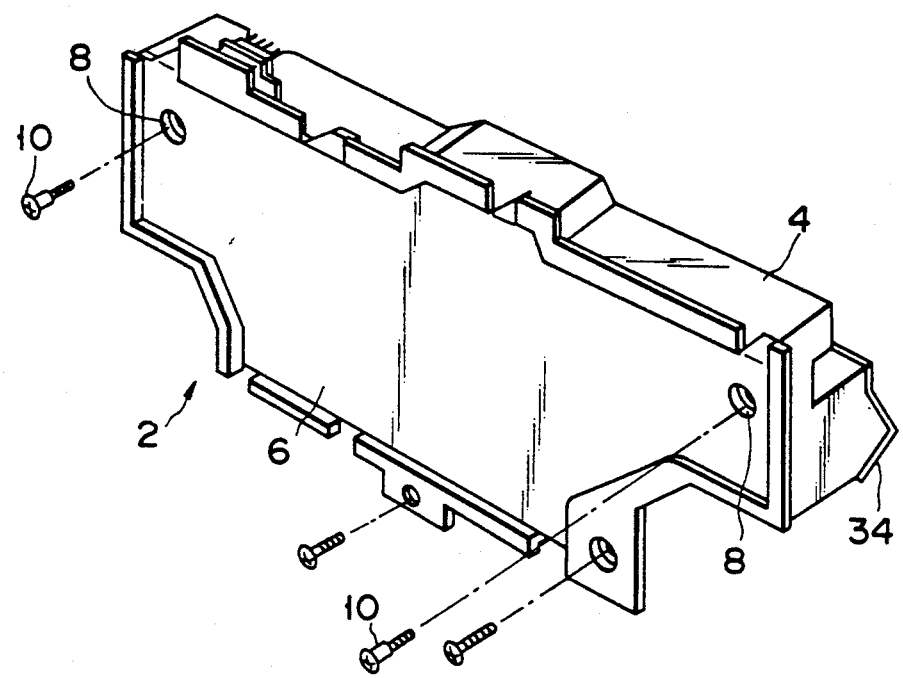
FIG. 3 is a perspective view of a bottom plate of the optical apparatus of FIG. 1.
Figure 4:
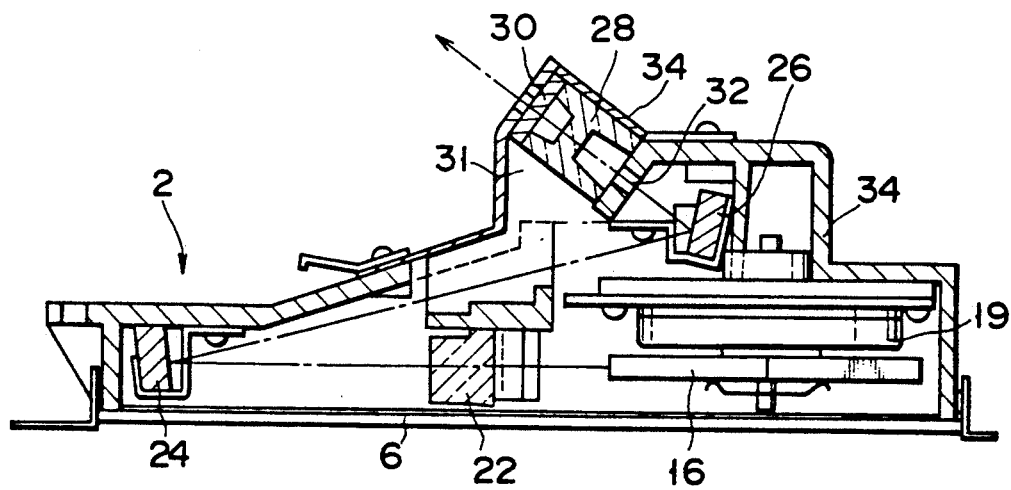
FIG. 4 is a cross-sectional view of the optical apparatus of FIGS. 1 to 3 along the secondary scanning direction with a polarization angle of 0°.

This invention will now be explained in detail, with reference to the accompanying drawings.

The first embodiment of this invention will now be described, referring to FIGS. 1 to 5C.

An exposure unit 2 constituting an optical apparatus is provided with a unitary housing 4 made of a blackplastic material. The housing 4 opens at the substantially whole area of its lower face. A bottom plate 6 also acting as a sealing member is fitted in the opening of the housing 4. The bottom plate 6 has screw holes 8 in which bolts 10 are inserted so as to engage nuts or the like embedded in the housing 4.

As shown in FIG. 1, the housing 4 contains a semiconductor laser element 12, a laser driving circuit board 14 for driving the laser element 12, a polygon mirror 16 acting as a light polarizing unit which scans light beams on an object to be scanned, a polygon-mirror driving circuit 18 for driving the polygon mirror 16, a motor 19, and a printed board, not shown, for supplying an electric power to electric parts such as the laser element 12, the light polarizing unit and the like. The housing 4 further includes a collimator lens 20 for collimating light beams from the laser element 12, which lens 20 is disposed between the laser element 12 and the polygon mirror 16 (although it is not seen in FIG. 4 because this figure is a cross-sectional view at the polarizing angle of 0°), a first fθ lens 22, a first imaging lens system having first and second mirrors 24 and 26 for turning an optical path backward, a second imaging lens system having a second fθ lens 28 for causing light beams to form an image on the image surface of a photo-sensitive member as the object to be scanned, a dust-proof glass 30, and a housing portion 31 for containing the second imaging lens system.

Formed in the upper portion of the housing 4 is a slit-shaped opening 32 for guiding light beams to the object to be scanned, that is, the light sensitive member, not shown, via the second imaging lens system. The opening 32 is sealed by the dust proof glass 30 of the second imaging lens system, and the peripheral light at the opening 32 is shielded by the cover 34.

The first fθ lens 22 has positive converging powers for converging light beams on the recording surface of the sensitive member in the main scanning direction and the secondary scanning direction, respectively. The second fθ lens 28 has a power in the main scanning direction, which power is combined with the power of the first fθ lens in the main scanning direction, such that an image is formed in a shape satisfying the condition $h = f\theta$ where $\theta$ is an angle of rotation of the reflecting surface of the polygon mirror 16, h is the height of the image at the angle of rotation $\theta$, and f is the compound focal length of the first and second fθ lenses 22 and 28, and also a power in the secondary scanning direction which power is combined with the power of the first fθ lens in the secondary scanning direction to converge light beams on the surface of the photo-sensitive member. The first fθ lens 22, the second fθ lens 28 and the dust-proof glass 30 are combined with the first mirror 24 and the second mirror 26 to form a light-beam passing area.

The operation of the first embodiment of this invention will now be explained with reference to FIGS. 1 to 4.

Light beams generated from the laser element 12 in the laser driving circuit 14 are formed into a predetermined shape by means of the collimator lens 20 to be scanned on the reflecting surface 17 of the polygon mirror 16 in the main scanning direction. The light beams from the polygon mirror 16 are converged by the first fθ lens 22 of the first imaging lens system in both the main and secondary directions and led to the first mirror 24 so as to be reflected toward the second mirror 26 by means of the first mirror. The reflected beams are reflected again by means of the first mirror 24 toward the second mirror 26. The light beams reflected twice are converged on the photo-sensitive member through the dust-proof glass 30 such that they cause the height of the image to be proportional to the rotation of angle 8 of the reflecting surface 17 of the polygon mirror 16 in the main scanning direction and form the image at a predetermined position on the surface of the photo-sensitive member in the secondary direction.

Figure 5A:
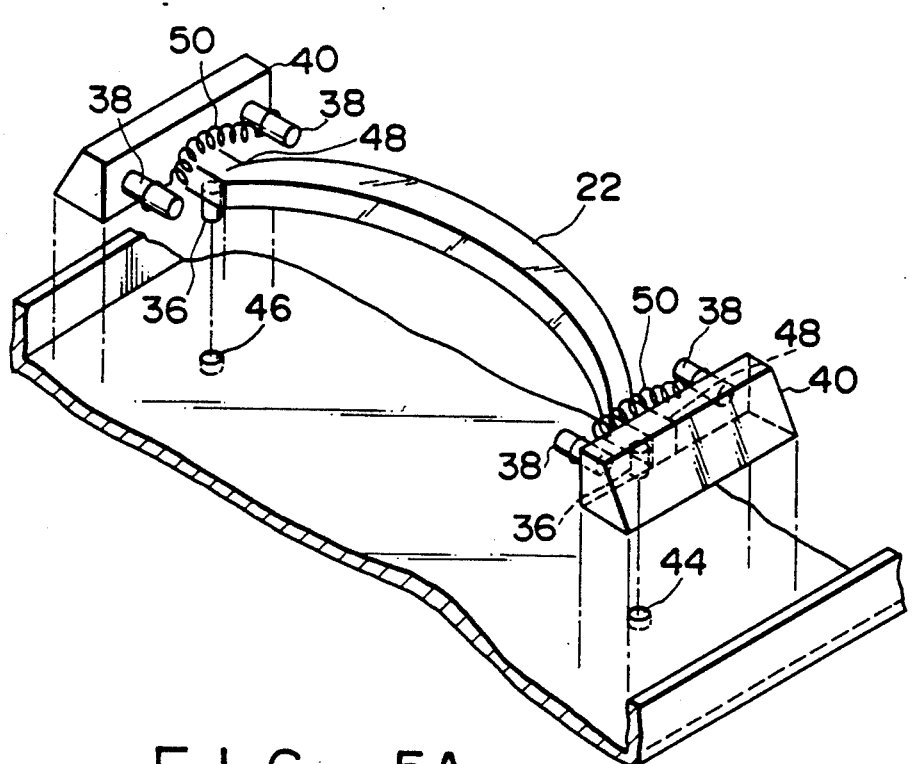
FIG. 5A is a perspective view of the first embodiment of the fixing method of a lens system.
Figure 5C:
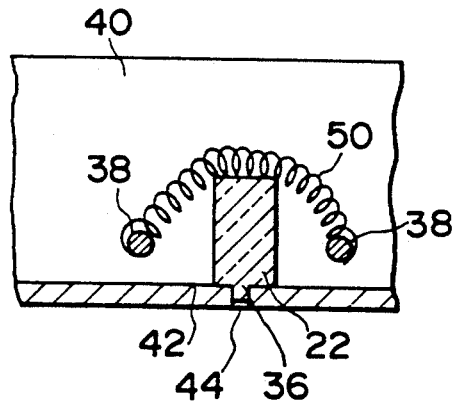
FIG. 5C is a traverse cross-sectional view in which the lens in FIG. 5B is set in position.
Figure 5B:
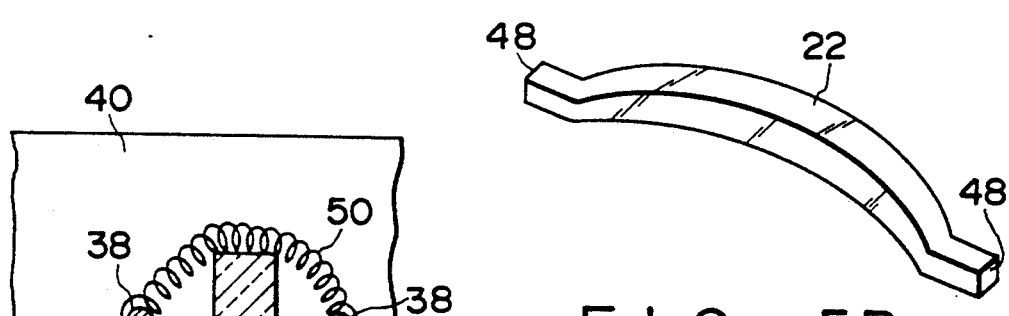
FIG. 5B is a perspective view of the lens shown in FIG. 5A.

FIGS. 5A and 5C show in one embodiment of the invention a means for fixing how to fix the lens 22 to the optical apparatus shown in FIGS. 1 to 4. FIG. 5A is a schematic perspective view showing how to effect the fixture of the first fθ lens 22, and FIG. 5C is a cross-sectional view how to fix the first fθ lens 22. FIG. 5B is a perspective view of the first fθ lens 22.

As seen from FIGS. 5A and 5C, the first fθ lens 22 (the other lenses also having the similar structure) has projections 36 for facilitating the lens to be placed at the datum position. The housing 4 is provided with mountings 40 having hooks 38 integrally formed thereon, connected thereto by means of screws or adhered thereto. Coil springs 50 are stretched between the respective pairs of the hooks 38. The projections 36 of the lens 22 are inserted in positioning holes 44 and 46 formed in the datum surface 42 of the housing 4 so that the bottom face of the lens 22 is in surface contact with the datum surface 42. Either the positioning hole 44 or the hole 46 or both holes are elongated holes extending in the direction along the optical axis of the datum surface 42 in order that the lens 22 is easily inserted in the holes 44 and 46 and the distance tolerance between the projections 36 formed on the lens 22 is made loose.

The lens 22 is accurately fixed under pressure to the datum surface 42 of the housing 4 at the required position in a simple manner by means of the fixing springs or coil springs 50 which press the spring seats 48 of the lens 22.

The use of the coil springs having such a simple structure and used as fixing members of the optical parts, ensures accurate fixture and easy replacement of the optical parts. Further, the member defining the datum surface to which the optical parts are fixed at the datum position is formed integrally with the housing means for containing the optical means, whereby fixture of the optical parts is accurately effected by means of the coil springs. As a result, the number of parts and the assembling error caused by accumulative tolerances of parts are reduced, the assembly efficiency is increased and the manufacturing and assembling costs decreased.

Figure 6:
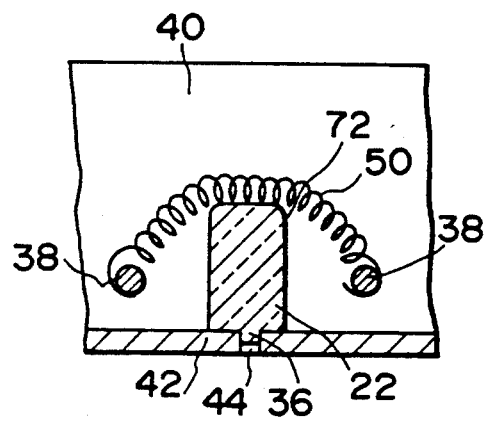
FIG. 6 is a transverse sectional view of the second embodiment of the fixing method of a lens system.

FIG. 6 shows the second embodiment of the fixing method of a lens assembled in the optical apparatus shown in FIGS. 1 to 4. In FIG. 6, a first fθ lens 22 is shown in a cross section at its fixed position. The same referential numerals are used for the parts and members as those of the first embodiment.

As apparent from FIGS. 6 and 7, the first fθ lens 22 (the other lenses also having the similar structure) has projections 36 for facilitating the placing of the lens at the datum position. The housing 4 is provided with mountings 40 having hooks 38 integrally formed thereon, connected thereto by screws or adhered thereto. Coil springs 50 are stretched between the respective pairs of the hooks 38. The projections 36 of the lens 22 are inserted in positioning holes 44 and 46 formed in the datum surface 42 of the housing 4 so that the bottom face of the lens 22 is in a surface contact with the datum surface 42. Either the positioning hole 44 or the hole 46, or both holes, are elongated holes extending in the direction along the optical axis of the datum surface 42 in order that the lens 22 is easily inserted in the holes 44 and 46 and the distance tolerance between the projections 36 formed on the lens 22 is made loose.

The lens 22 is accurately fixed under pressure to the datum surface 42 of the housing 4 at the required position in a simple manner by means of the fixing springs or coil springs 50 which press the spring seats 48 of the lens 22. Since the edges of each spring seat 48 are rounded to form curved face portions 72, the coils of each coil spring 50 are prevented from being caught by the edges or cutting thereinto so that the lens 22 is always applied by an optimum pressure. The formation of the edges of the spring seats 48 into curved portions 72 avoids uneven elongation and/or deformation of the coil springs 50.

As explained above, the coil springs having a simple structure are used as fixing members for fixing the optical parts, and those faces of the optical parts which receive the pressure of the coil springs are curved, whereby the optical parts can be fixed securely and replaced easily. Further, the coil springs for fixing the optical parts can be prevented from being elongated unevenly and/or deformed. Still further, the member defining the datum surface to which the optical parts are fixed at the datum position is formed integral with the housing means for containing the optical means, whereby the fixture of the optical parts is effected accurately by means of the coil springs having a simple structure. As a result, the number of parts and the assembling error caused by the accumulative tolerances of the parts are reduced, assembling efficiency is increased and manufacturing and assembling costs are decreased.

Figure 7A:
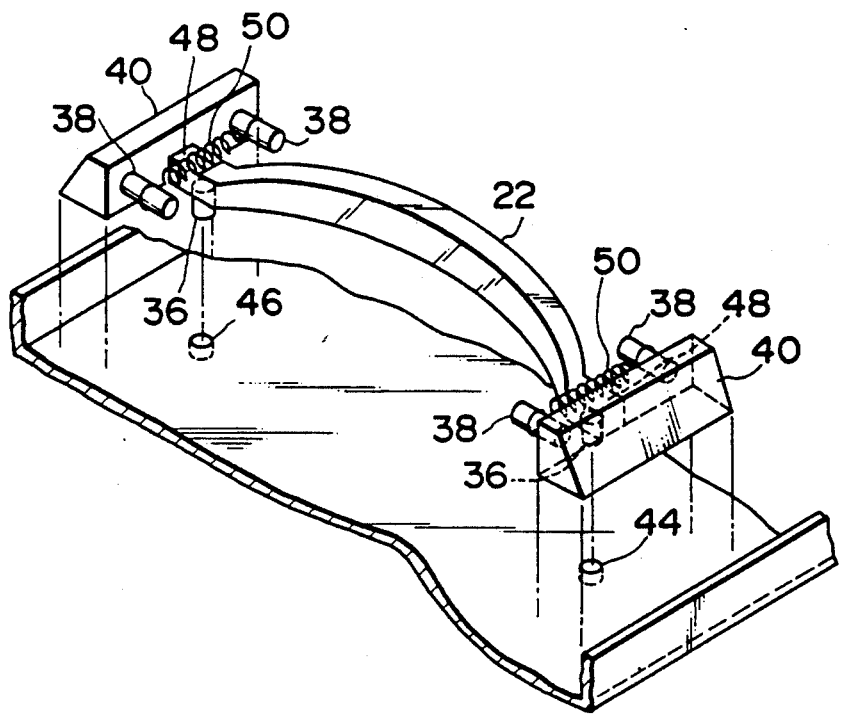
FIG. 7A is a perspective view of the third embodiment of the fixing method of a lens system.
Figure 7B:
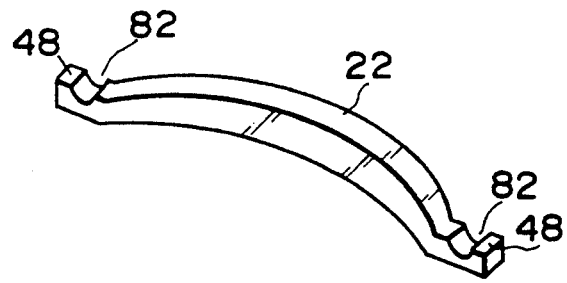
FIG. 7B is a perspective view of the lens shown in FIG. 7A.
Figure 7C:
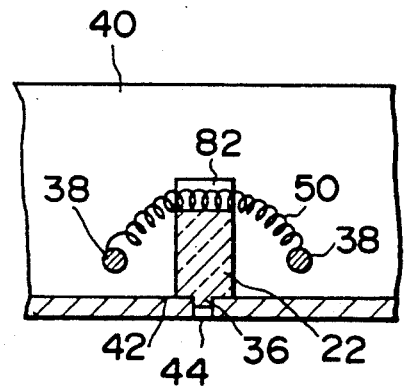
FIG. 7C is a cross-sectional view of the lens of FIG. 7A which lens is in the fixed state.

Referring to FIGS. 7A to 7C, there will now be explained the third embodiment of the fixing method of the lens assembled in the optical apparatus shown in FIGS. 1 to 4. FIG. 7A is a schematic view showing how to effect the fixture of a first fθ lens 22. FIG. 7B is a perspective view of the first fθ lens 22. FIG. 7C is a cross-sectional view of the first fθ lens 22 at its fixed position. The same referential numerals are used for the parts and members as those of the first and second embodiments.

As seen from FIGS. 7A and 5C, the first fθ lens 22 (the other lenses also having the similar structure) includes grooves 82 for receiving coil springs 50 and projections 36 which facilitate the lens to be placed at the datum position. The housing 4 is provided with mountings 40 having hooks 38 integrally formed thereon, connected thereto by means of screws or adhered thereto. Coil springs 50 are stretched between the respective pairs of the hooks 38. The projections 36 of the lens 22 are inserted in a positioning hole 44 formed in the datum surface 42 of the housing 4 so that the bottom face of the lens 22 makes a surface contact with the datum surface 42. The positioning hole 44 is an elongated hole extending in the direction along the optical axis of the datum surface 4 in order that the lens 22 is easily inserted in the holes 44 and 46 and the distance tolerance between the projections 36 formed on the lens 22 is made loose.

The lens 22 is accurately fixed under pressure to the datum surface 42 of the housing 4 at the required position in a simple manner by means of the fixing springs or coil springs 50 which are received in the grooves 82 formed in the spring seats 48 of the lens 22. Since each groove 82 has a recessed semicircular cross section or a rectangular cross section, the lens 22 is always pressed at an optimum pressure and further prevented from moving in the main scanning directions. Still further, the coil springs 50 are placed in the grooves 82 so that they are prevented from projecting from the lens 22.

Figure 8:
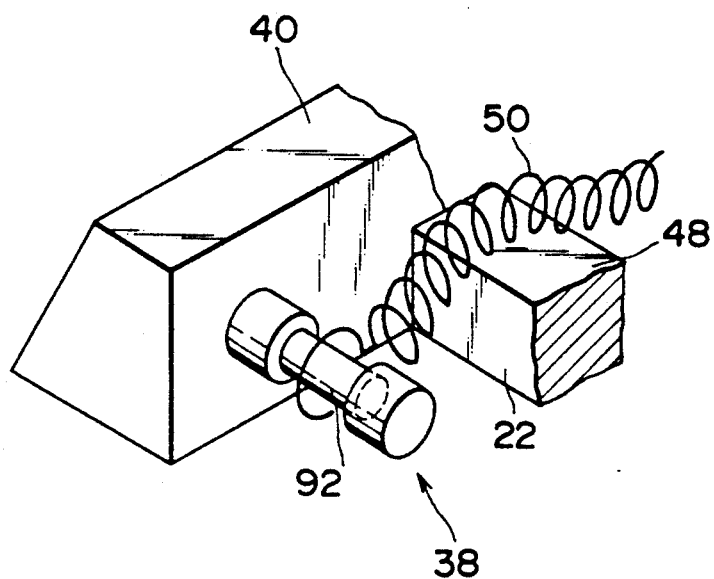
FIG. 8 is a perspective view of a modification of optical parts which can be commonly used for the first to third embodiments.

FIG. 8 shows a modification of the hook commonly used in the embodiments of FIGS. 5A to 7C.

The hook 38, provided in the housing 4 has a groove or a depression 92 in which the coil spring 50 is received. This arrangement avoids the displacement of the coil springs 50 for pressing the lens 22 in the main scanning direction in parallel with the datum surface 42, ensuring firm fixture of the lens 22.

Each method for fixing a lens as shown in FIGS. 5A to 7C is not only applied to the lens 22, but also it is applicable to all optical parts including the first and second mirrors.

As explained above, each coil spring having a simple structure is used as a fixing member for fixing each optical part, and each optical part has a groove for receiving the pressure of the coil spring. Consequently, the optical parts are fixed securely and replaced easily. Further, since the member having the datum surface, to which the optical parts are fixed at the datum positions, is formed integral with the housing means for containing the optical means, the optical parts are accurately fixed by means of the coil springs having a simple structure. Still further, the coil springs for fixing the optical parts are arranged in the range of the height of the optical parts, thereby reducing the thickness of the optical apparatus.

With this invention, not only the number of parts and the assembling error caused by the accumulative tolerances of the parts are reduced, but also the assembly efficiency is increased and the manufacturing and assembling costs decreased. Further, the optical apparatus is small.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical unit for a printing apparatus, comprising:
   means for generating a light beam;
   means for deflecting the light beam generated by the generating means;
   a lens for converting the deflecting light beam to a convergent light beam, said converting lens having engaging side portions;
   at least one support member having at least two engaging sections; and
   at least one coil spring member having an axis of elastic expansion and contraction, for urging the converting lens to the support member in a direction substantially normal to the axis of elastic expansion and contraction, and said at least one coil spring member engaging each of the engaging side portions of the converting lens.

2. An optical unit according to claim 1, wherein the optical unit further comprises optical means having at least one lens for scanning light beams, and having a curved face, the pressure of said coil spring member being received by said curved face.

3. An optical unit according to claim 1, wherein the optical unit further comprises optical means having at least one lens for scanning light beams, and having a groove-shaped face, the pressure of said coil spring member being received by said groove-shaped face.

4. An optical unit for a printing apparatus, comprising:
   means for generating a light beam;
   means for deflecting the light beam generated by the generating means;
   a lens for converting the deflecting light beam to a convergent light beam, said converting lens having engaging side portions, each side portion having a groove;
   at least one support member for supporting the converting lens; and
   at least one coil spring member for urging the converting lens to the support member, said at least one coil spring member engaged to the groove of each of the engaging side portions of the converting lens.

5. An optical unit for a printing apparatus, comprising:
   means for generating a light beam;
   means for deflecting the light beam generated by the generating means;
   a lens for converting the deflected light beam to a convergent light beam, said converting lens having at least two engaging side portions for accommodating at least two engaging projections, each engaging side portion having a groove;
   at least one supporting member for supporting the converting lens;
   at least one coil spring member having an axis of elastic expansion and contraction, for urging the converting lens to the support member in a direction substantially normal to the axis of elastic expansion and contraction, an said at least one coil spring member engaged in the groove of each engaging side portion of the converting lens; and
   housing means having a datum surface to which said converting lens is fixed, and having at least two positioning holes into which said at least two projections are inserted.

* * * * *